United States Patent
Lo

(10) Patent No.: US 9,979,507 B1
(45) Date of Patent: May 22, 2018

(54) METHODS AND NETWORK DEVICE FOR GENERATING COMMUNICATION FRAMES IN 1000BASE-T1 ETHERNET

(71) Applicant: Marvell International Ltd., Hamilton (BM)

(72) Inventor: William Lo, Cupertino, CA (US)

(73) Assignee: Marvell International Ltd., Hamilton (BM)

(*) Notice: Subject to any disclaimer, the term of this patent is extended or adjusted under 35 U.S.C. 154(b) by 336 days.

(21) Appl. No.: 14/814,203

(22) Filed: Jul. 30, 2015

Related U.S. Application Data

(60) Provisional application No. 62/030,896, filed on Jul. 30, 2014.

(51) Int. Cl.
*H04L 1/00* (2006.01)

(52) U.S. Cl.
CPC .................. *H04L 1/0007* (2013.01)

(58) Field of Classification Search
CPC ............ H04L 1/0042; H04L 1/0007
See application file for complete search history.

(56) References Cited

U.S. PATENT DOCUMENTS

| | | | |
|---|---|---|---|
| 6,362,757 B1 | 3/2002 | Lee et al. | |
| 6,476,737 B1 | 11/2002 | Caroselli et al. | |
| 6,504,493 B1 | 1/2003 | Burd | |
| 6,813,651 B1 | 11/2004 | Smith et al. | |
| 7,251,699 B1 | 7/2007 | Lo | |
| 2001/0034729 A1 | 10/2001 | Azadet et al. | |
| 2003/0147654 A1 | 8/2003 | Sung et al. | |
| 2003/0187994 A1 | 10/2003 | Jackson et al. | |
| 2009/0276680 A1* | 11/2009 | Chiu | G06F 11/1068 714/752 |
| 2010/0235706 A1* | 9/2010 | Eberlein | H03M 13/2707 714/752 |

OTHER PUBLICATIONS

IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, 379 pages (Mar. 8, 2002).
IEEE Std. 802.3bp™/D1.5, "Draft Standard for Ethernet Amendment: Physical Layer Specifications and Management Parameters for 1Gb/s Operation over a Single Twisted Pair Copper Cable," *The Institute of Electrical and Electronics Engineers, Inc.*, 202 pages (Jun. 14, 2015).
"IEEE Standard for Ethernet, Section Four," IEEE Std. 802.3-2012, *The Institute for Electrical and Electronics Engineers*, pp. 1-732 (2012).
"IEEE Standard for Ethernet ,Amendment 2: Physical Layer Specifications and Management Parameters for 100 Gb/s Operation Over Backplanes and Copper Cables," IEEE Std. 802.3bjTM-2014, *The Institute for Electrical and Electronics Engineers*, 368 pages (Jun. 12, 2014).

* cited by examiner

*Primary Examiner* — Gbemileke J Onamuti

(57) ABSTRACT

A training frame is generated, and the training frame includes a plurality of partial frames that include training information. The training frame has a defined duration. The training frame is generated by inverting a first bit in each of at least some partial frames, and including an info field frame in the training frame. The training frame is transmitted for training purposes.

34 Claims, 11 Drawing Sheets

FIG. 7

| Symbol | Definition | RS(180, 154) | RS(360, 308) | RS(630, 539) |
|---|---|---|---|---|
| RS | # PAM3 symbols per RS frame | 1260 | 2520 | 4410 |
| RST | Duration of RS frame (ns) | 1680 | 3360 | 5880 |
| PRS | # PAM3 symbols per partial RS frame | 90 | 90 | 90 |
| PRST | Duration of partial RS frame (ns) | 120 | 120 | 120 |
| PF | # partial frames per RS frame | 14 | 28 | 49 |
| QF | # RS frame per quiet/refresh cycle | 128 | 64 | 36 |
| AF | # partial RS frames separating alert windows | 28 | 28 | 28 |
| Refresh_LPI | # partial RS frames for refresh | 12 | 12 | 12 |
| Enter_LPI_RS | # RS frames with all LPI to enter LPI | 4 | 2 | 1 |
| Alert_LPI | # alert sequences to exit LPI | 11 | 11 | 11 |
| Exit_LPI_RS | # RS frames with all idles upon exit LPI | 4 | 2 | 1 |
| Alert_sym | # symbols in alert sequence | 90 | 90 | 90 |

METHODS AND NETWORK DEVICE FOR GENERATING COMMUNICATION FRAMES IN 1000BASE-T1 ETHERNET

CROSS-REFERENCES TO RELATED APPLICATIONS

This application claims the benefit of U.S. Provisional Patent Application No. 62/030,896, entitled "1000BASE-T1 Training and Energy Efficient Ethernet," filed on Jul. 30, 2014, the disclosure of which is incorporated herein by reference in its entirety.

FIELD OF THE DISCLOSURE

The present disclosure is related generally to communication networks and, more particularly, to generation of communication frames for training purposes and for supporting Energy Efficient Ethernet.

BACKGROUND

Gigabit Ethernet is designed to transmit Ethernet frames at a rate of one gigabits per second (1 Gb/s). Gigabit Ethernet utilizes physical layer (PHY) processing devices such as 1000BASE-T1, as defined by the Institute of Electrical and Electronics Engineers (IEEE) 802.3 bp Ethernet Standard. A 1000BASE-T1 PHY processing device supports full-duplex operation at 1 Gb/s over a single twisted copper wire pair. A 1000BASE-T1 PHY processing device can operate in severely constrained environments, such as automotive and industrial environments in which certain requirements (e.g., electromagnetic compatibility and temperature requirements) must be met.

SUMMARY

In an embodiment, a method includes generating, at a network interface device, a training frame comprising a plurality of partial frames that include training information. The generating of the training frame includes inverting, at the network interface device, a first bit in each of at least some partial frames, and including, at the network interface device, an info field frame in the training frame. The method further includes transmitting, with the network interface device, the training frame for training purposes.

In another embodiment, a duration of the training frame is the same as a duration of a Reed-Solomon encoded frame.

In still another embodiment, the info field frame includes a partial frame count field having a value, and the method further includes receiving, at the network interface device, another info field frame from another network interface device, where a beginning of the other info field frame is received within one partial frame duration of transmission of a beginning of the info field frame, and the other info field frame includes a partial frame count field having the value.

In yet another embodiment, a method includes maintaining, at a first network interface device, a first counter that increments for each partial frame transmitted by the first network interface device to a second network interface device. The method further includes generating, at the first network interface device, a training frame for training purposes, where the training frame includes a plurality of partial frames that include training information. The generating of the training frame comprises including, at the first network interface device, a first info field frame in the training frame, where the first info field frame includes a first partial frame count field having a first value corresponding to a first count of the first counter. The first partial frame count field is for synchronizing a second counter of the second network interface device with the first counter of the first network interface device. The method further includes transmitting, with the first network interface device, the training frame to the second network interface device. The method includes receiving, at the first network interface device, a second info field frame from the second network interface device, where a beginning of the second info field frame is received within one partial frame duration of transmission of a beginning of the first info field frame. The second info field includes a second partial frame count field having a second value corresponding to a second count of the second counter, and the first value is the same as the second value.

In an embodiment, a duration of the training frame is the same as a duration of each error correction encoded frame exchanged between the first network interface device and the second network interface device.

In another embodiment, each error correction encoded frame is a Reed-Solomon encoded frame.

In yet another embodiment, the method also includes entering, at the first network interface device, a low power idle (LPI) mode. During the LPI mode, the method includes using, at the first network interface device, the first counter to determine timing of a plurality of alert windows, where alert windows in the plurality of alert windows are spaced apart from one another by a defined duration that is the same as a duration of one or more partial frame. The method further includes exiting, at a receive portion of the first network interface device, a low power mode during the plurality of alert windows and re-entering the low power mode, at the receive portion of the first network device, between alert windows in the plurality of alert windows. The method includes exiting, at the first network interface device, the LPI mode only when an alert signal is received within one of the alert windows.

In an embodiment, a network interface device includes a physical layer (PHY) processing device. The PHY processing device is configured to generate a training frame comprising a plurality of partial frames that includes training information. The PHY processing device is configured to generate the training frame by inverting a first bit in each of at least some partial frames, and including an info field frame in the training frame. The PHY processing device is further configured to transmit the training frame to another PHY processing device for training purposes.

In another embodiment, a network interface device includes a physical layer (PHY) processing device. The PHY processing device is configured to maintain a first counter that increments for each partial frame transmitted by the network interface device to a second network interface device. The PHY processing device is further configured to generate a training frame for training purposes, where the training frame comprises a plurality of partial frames that include training information. The PHY processing device is configured to generate the training frame by including a first info field frame in the training frame, where the first info field frame includes a first partial frame count field having a first value corresponding to a first count of the first counter. The first partial frame count field is for synchronizing a second counter of the second network interface device with the first counter of the network interface device. The PHY processing device is then configured to transmit the training frame to the second network interface device. The PHY processing device is configured to receive a second info field frame from the second network interface device, where a beginning of the second info field frame is received within one partial frame duration of transmission of a beginning of the first info field frame. The second info field includes a second partial frame count field having a second value corresponding to a second count of the second counter, and the first value is the same as the second value.

In yet another embodiment, the PHY processing device is further configured to enter a low power idle (LPI) mode. During the LPI mode, the PHY processing device is configured to use the first counter to determine timing of a plurality of alert windows, where alert windows in the plurality of alert windows are spaced apart from one another by a defined duration that is the same as a duration of one or more partial frames. The PHY processing device is also configured to exit, at a receive portion of the PHY processing device, a low power mode during the plurality of alert windows and re-enter the low power mode, at the receive portion of the PHY processing device, between alert windows in the plurality of alert windows. The PHY processing device is further configured to exit the LPI mode only when an alert signal is received within one of the alert windows.

BRIEF DESCRIPTION OF THE DRAWINGS

FIG. 7 is table of example parameter values according to various Reed-Solomon error correction encoding schemes, utilized at a PHY processing device, according to an embodiment.

DETAILED DESCRIPTION

In embodiments described below, a network interface device (e.g., which is included in a communication device such as an endpoint device (e.g., a server, a desktop computer, a laptop computer, etc.) or an intermediate network device (e.g., a network switch, a network bridge, a network hub, a network router, etc.) or other suitable network device) includes a PHY processing device, for example, a 1000BASE-T1 PHY processing device. According to various embodiments, a network interface device includes a 1000BASE-T1 PHY processing device having finer communication frame resolution, which (i) allows quicker clock locking and synchronization between the 1000BASE-T1 PHY processing device and its link partner and (ii) provides support for Energy Efficient Ethernet (EEE) with only one channel in the link.

Figure 1:
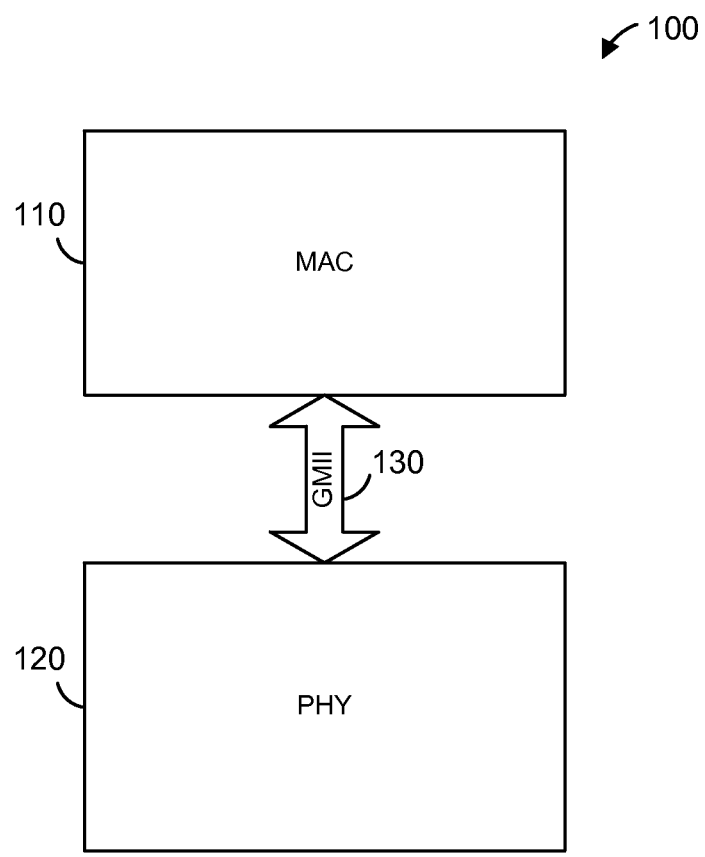
FIG. 1 is a block diagram of an example network interface device, according to an embodiment.

FIG. 1 is a block diagram of an example network interface device 100, according to an embodiment. The network interface device 100 is included in a communication device such as an endpoint device, an intermediate network device, or other suitable network device configured to operate within a networked environment, in various embodiments. The network interface device 100 includes at least a media access control (MAC) processing device 110 and a physical layer (PHY) processing device 120. In an embodiment, the MAC processing device 110 is compliant with the IEEE 802.3 Ethernet Standard. In other embodiments, the MAC processing device 110 is compliant with another suitable communication protocol. The MAC processing device 110 is communicatively coupled to the PHY processing device 120 through a Gigabit Media Independent Interface (GMII) 130, according to an embodiment. In other embodiments, the MAC processing device 110 is communicatively coupled to the PHY processing device 120 via another suitable communication interface. In various embodiments, the PHY processing device 120 is a 1000BASE-T1 PHY processing device, as defined by the IEEE 802.3 bp Ethernet Standard. In an embodiment, the PHY processing device 120 is responsible for at least receiving bits provided by the MAC processing device 110, encoding the received bits, scrambling the encoded bits, and modulating the bits to generate an Ethernet frame that is compatible with the IEEE 802.3 bp Ethernet Standard.

Figure 2A:
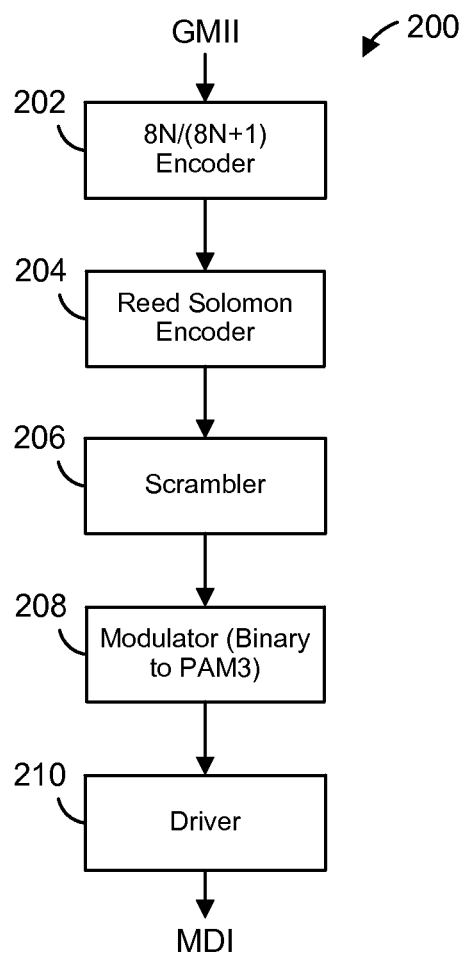
FIG. 2A is a block diagram of an example transmit portion of a PHY processing device, according to an embodiment.

FIG. 2A is a block diagram of an example transmit portion 200 of a PHY processing device (sometimes referred to herein as a PHY transmitter), according to an embodiment. In some embodiments, the PHY transmitter 200 is a transmit portion of the PHY processing device 120 (a 1000BASE-T1 PHY processing device) in the network interface device 100 of FIG. 1, and FIG. 2A is described with reference to FIG. 1 for explanatory purposes. In other embodiments, however, the PHY transmitter 200 is a portion of another suitable network interface device.

The PHY transmitter 200 includes at least an 8N/(8N+1) encoder 202, a Reed-Solomon (RS) error correction encoder 204, a scrambler 206, a modulator 208, and a driver 210. In various embodiments, the PHY transmitter 200 is configured to receive a plurality of bits from a MAC processing device (e.g., the MAC processing device 110) via a GMII (e.g., the GMII 130). The 8N/(8N+1) encoder 202 is configured to encode the received bits according to the 8N/(8N+1) pointer based coding scheme as described in U.S. Pat. No. 7,251,699, entitled "Low Overhead Coding with Arbitrary Control Symbol Placement", the entirety of which is incorporated by reference herein. Then, forward error correction encoding is performed on the 8N/(8N+1)-encoded bits via the RS encoder 204 to generate RS parity bits. The RS encoder 204 is further configured to aggregate the RS parity bits with the 8N/(8N+1)-encoded bits to form a RS-encoded frame. The scrambler 206 is configured to scramble the bits in RS-encoded frame. The RS-encoded frame is modulated via the modulator 208, which utilizes 3 level pulse amplitude modulation (PAM3) transmitted at a rate of 750 MHz. Then, the driver 210 of the PHY transmitter 200 is configured to provide the PAM3 symbols to a medium dependent interface (MDI), which in turn couples to a transmission medium. In other embodiments, the PHY transmitter 200 further includes a shaper (not shown in FIG. 2A), and the PAM3 symbols output by the modulator 208 are first shaped by the shaper before being transmitted by the driver 210.

Figure 2B:
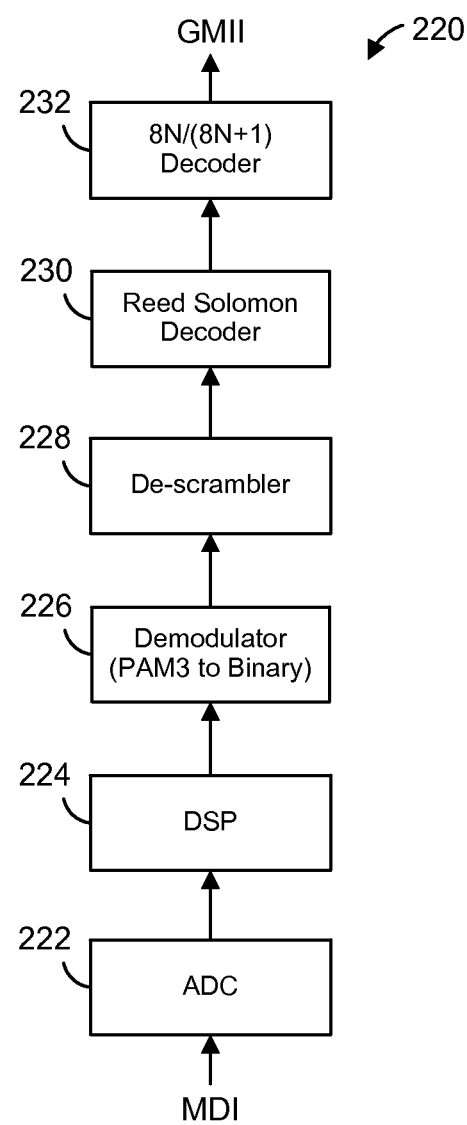
FIG. 2B is a block diagram of an example receive portion of a PHY processing device, according to an embodiment.

FIG. 2B is a block diagram of an example receive portion 220 of a PHY processing device (sometimes referred to herein as a PHY receiver), according to an embodiment. In some embodiments, the PHY receiver 220 is a receive portion of the PHY processing device 120 (a 1000BASE-T1 PHY processing device) in the network interface device 100 of FIG. 1, and FIG. 2B is described with reference to FIG. 1 for explanatory purposes. In other embodiments, however, the PHY receiver 220 is a portion of another suitable network interface device.

The PHY receiver 220 includes at least an analog to digital converter (ADC) 222, a digital signal processor (DSP) 224, a demodulator 224, a de-scrambler 228, a RS decoder 230, and an 8N/(8N+1) decoder 232. In various embodiments, the PHY receiver 220 is configured to receive an analog signal from a medium via a MDI. The ADC 222 is configured to convert the received analog signal into a digital signal, which is then processed by the DSP 224, which outputs a digital signal having PAM3 symbols. Next, the demodulator 226 is configured to demodulate the PAM3 symbols into binary bits. The bits are then de-scrambled via the de-scrambler 228. The RS decoder 230 is configured to decode the de-scrambled bits and perform error correction. The error-corrected bits are then further decoded via the 8N/(8N+1) decoder 232 before being transmitted to a MAC processing device (e.g., the MAC processing device 110) via a GMII (e.g., GMII 130).

In various embodiments, a 1000BASE-T1 PHY processing device can be configured either as a master PHY processing device or a slave PHY processing device. A master PHY processing device uses a free running local clock to determine the timing of transmitter operations. A slave PHY processing device recovers the clock from the signal received from the master PHY processing device and uses the received signal to determine the timing of transmitter operations. Furthermore, the master PHY processing device and the slave PHY processing device are configured to synchronize their clocks and timing of transmitter operations during a training mode before entering normal data transmission mode.

Referring again to FIG. 2A, to provide adequate burst protection for the 8N/(8N+1)-encoded bits, the RS encoder 204 is configured to generate a minimum number of RS parity bits. The generated RS parity bits are then added to the 8N/(8N+1)-encoded bits to form a RS-encoded frame. The length and duration of the RS-encoded frame are based on the total number of bits in the RS-encoded frame, i.e., the number of 8N/(8N+1)-encoded bits and the number of RS parity bits. A typical RS-encoded frame, however, has long frame length and frame duration. As illustrative examples, a RS encoding scheme denoted by RS(180, 154) results in a frame duration of 1680 ns, a RS encoding scheme denoted by RS(360, 308) results in a frame duration of 3360 ns, and a RS encoding scheme denoted by RS(630, 539) results in a duration of 5880 ns. As used herein, the notation of RS(N, K) represents a RS encoding scheme in which N symbols are encoded to make a K symbol RS codeword. In some embodiments, each symbol corresponds to 11-bits. In other embodiments, each symbol corresponds to a different suitable number of bits. Due to the long duration of the RS-encoded frame, it is impractical to synchronize timing of an Ethernet link (a master PHY processing device and a slave PHY processing device) based on a count of RS-encoded frames.

Figure 3:
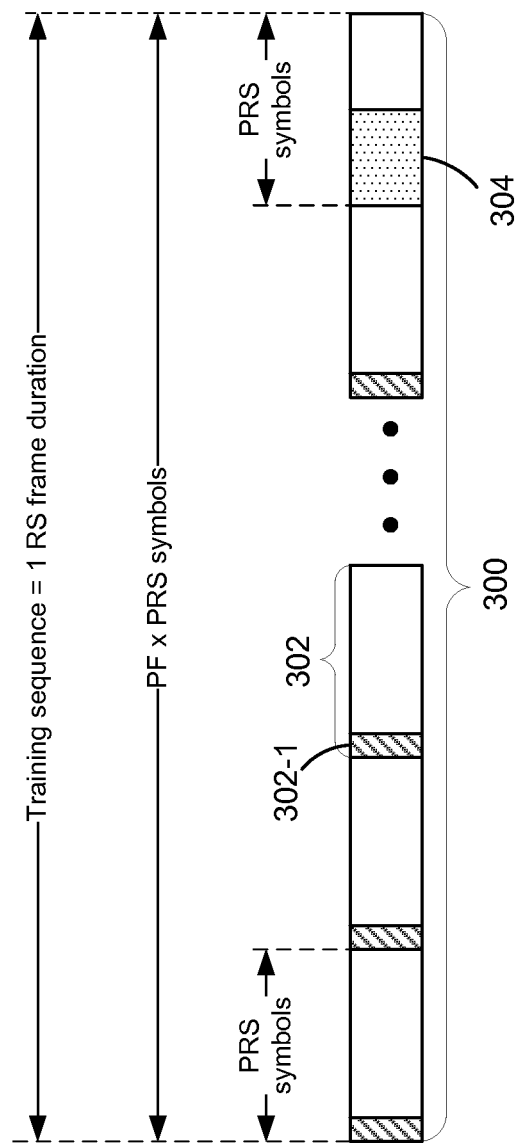
FIG. 3 is a diagram of an example training frame generated at a PHY processing device, according to an embodiment.

FIG. 3 is a diagram of an example training frame 300 generated at a PHY processing device, according to an embodiment. In some embodiments, the training frame 300 is generated at the PHY processing device 120 (a 1000BASE-T1 PHY processing device) of the network interface device of FIG. 1, and FIG. 3 is described with reference to FIG. 1 for explanatory purposes. In other embodiments, however, the training frame 300 is generated by another suitable network interface device. The PHY processing device is configured either as a master PHY processing device or a slave PHY processing device.

The training frame 300 is a communication frame having a defined duration, where the training frame 300 includes training signals and/or training information. In FIG. 3, the training frame 300 has the same frame duration as a RS-encoded frame, according to an embodiment. In other embodiments, the duration of the training frame 300 is the same as a duration of a communication frame exchanged between the PHY processing device 120 and its link partner. For example, in other embodiments, the training frame 300 has the same frame duration as a communication frame that does not correspond to an error correction encoding frame, or corresponds to an error correction encoding frame that uses another suitable error correction scheme other than RS. The training frame 300 is divided into a number, PF, of partial frames 302. Each partial frame 302 includes a number, PRS, of symbols. The frame duration of the training frame 300 can be represented as a number, PF×PRS, of symbols. To mark a boundary of the partial frame 302, the PHY processing device 120 is configured to invert a respective first bit 302-1 of each partial frame 302 (except at least one partial frame (e.g., a partial frame having an info field frame), which is discussed below). The PHY processing device 120 is further configured to insert an information (info) field frame 304 in the training frame 300 to convey various parameters of the link. One info field frame 304 is inserted per RS frame duration, according to an embodiment. In an embodiment, the info field frame 304 is indicated by an XORed 0xBBA7 pattern. In other embodiments, the info field frame 304 is indicated by another suitable pattern. In FIG. 3, the info field frame 304 begins a last partial frame of the training frame 300. In other embodiments, however, the info field frame 304 is inserted in another location in the training frame 300. In various embodiments, the info field frame 304 is exchanged between the PHY processing device 120 and its link partner during training mode to track of the state of each device. The first bit of the last partial frame is not inverted, according to an embodiment.

In operation, the PHY processing device 120 is configured to transmit the training frame 300, including the info frame field 304, to its link partner. In turn, the link partner is configured to determine the number of partial frames 302 transmitted by the PHY processing device 120 by counting the number of inverted bits 302-1. Referring to FIG. 3, the link partner is configured to determine the number of partial frames 302 transmitted by the PHY processing device 120 by counting i) the number of inverted bits 302-1 and ii) the info field frame 304. Counting the number of partial frames 302 allows the PHY processing device 120 and its link partner to synchronize their timing more quickly than counting the number of frames having the same duration as a RS-encoded frame.

Figure 4:
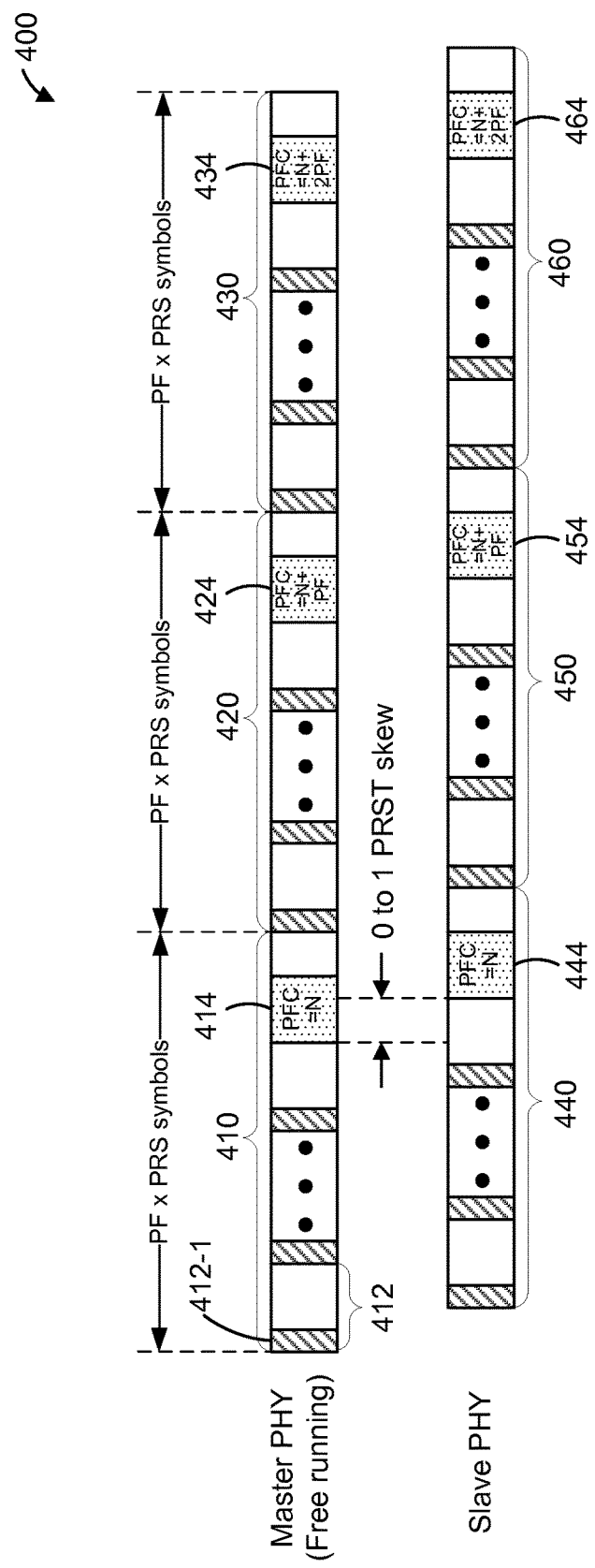
FIG. 4 is a diagram of an example training signals utilized for timing synchronization, according to another embodiment.

FIG. 4 is a diagram of an example timing synchronization signals 400 exchanged between a master device and a slave device, according to an embodiment. In some embodiments, the time synchronization signals 400 are generated by PHY processing devices such as the PHY processing device 120 (a 1000BASE-T1 PHY processing device) of FIG. 1 and its link partner, and FIG. 4 is described with reference to FIG. 1 for explanatory purposes. In other embodiments, however, the timing synchronization signals 400 are generated by another suitable pair of network interface devices. In some embodiments, the PHY processing device 120 is configured as a master PHY processing device, and the link partner of the PHY processing device 120 is configured as a slave PHY processing device. In other embodiments, the PHY processing device 120 is configured as the slave PHY processing device, and its link partner is configured as the master PHY processing device.

The master PHY processing device has a free running local clock and is configured to maintain a count of partial frames (PFC), which indicates a number of partial frames that have been generated. The master PHY processing device is configured to generate a plurality of training frames, e.g. a first training frame 410, a second training frame 420, and a third training frame 430, with each training frame having the same duration as a RS-encoded frame. In another embodiment, each training frame has the same duration as another error correction encoded frame. Each training frame is divided into PF partial frames, e.g., the first training frame 410 is divided into PF partial frames 412. Each partial frame includes PRS number of symbols (e.g., PAM3 symbols). The boundary of each partial frame (except for at least one partial frame, e.g., the last partial frame) is marked by an inverted first bit, e.g., the boundary of the partial frame 412 is denoted by its inverted first bit 412-1.

Each training frame further includes an info field frame, which contains various parameters of the link. For example, the first training frame 410 includes a first info field frame 414, the second training frame 420 includes a second info field frame 424, and the third training frame 430 includes a third info field frame 434. Each info field frame includes a partial frame count (PFC) field, which indicates the number of partial frames that have been generated. For example, the PFC field in the first info field frame 424 is N, since N partial frames have been generated; the PFC field in the second info field frame 434 is N+PF, since PF partial frames have been generated since the first info field frame 424; and the PFC field in the third info field frame 434 is N+2*PF, since PF partial frames have been generated since the second info field frame 424, or 2*PF partial frames have been generated since the first info field frame 414. For each training frame generated, the PFC field in the info field frame is incremented by PF.

In various embodiments, the master PHY processing device is configured to transmit the training frames, including the info field frames, to the slave PHY processing device. The slave PHY processing device is configured to recover the clock based on the signal received from the master PHY processing device. The slave PHY processing device is further configured to use the received signal to determine the timing of transmitter operations. For example, the slave PHY processing device is configured to maintain a PFC based on the PFC fields received from the master PHY processing device. In an embodiment, the PFC maintained by the PHY processing device should be the same as the PFC maintained by the master processing device, but with a delay. In an embodiment, the slave PHY processing device is configured to accept the PFC field transmitted by the master PHY processing device only if a cyclic redundancy check (e.g., CRC-16) returns no errors.

Referring to FIG. 4, the slave PHY processing device is configured to generate its own training frames, e.g., a fourth training frame 440, a fifth training frame 450, and a sixth training frame 460, based on the training frames transmitted by the master PHY processing device (e.g., training frames 410, 420, and 430). Each training frame generated at the slave PHY processing device has the same frame duration as an RS-encoded frame, and each training frame is divided into PF partial frames. Each partial frame includes PRS number of symbols. The boundary of each partial frame (except for at least one partial frame, e.g., the last partial frame) is marked by an inverted first bit.

The slave PHY processing device is further configured to generate one info field frame per training frame. For example, the slave PHY processing device is configured to generate a fourth info field frame 444 in the fourth training frame 440, a fifth info field frame 454 in the fifth training frame 450, and a sixth info field frame 464 in the sixth training frame 460. Like the info field frame generated by the master PHY processing device, each info field frame generated by the slave PHY processing device includes a PFC field. The PFC field generated by the slave PHY processing device indicates the PFC maintained by the slave PHY processing device. A PFC field from the slave PHY processing device should be transmitted within between zero to one partial frame duration (PRST) after the master PHY processing device transmits a PFC field, and the PFC field from the slave PHY processing device should have the same value as the PFC transmitted by the master PHY processing device. For example, the PFC field in the fourth info field frame 444 is N, which is based on the PFC field in the first info field frame 414; the PFC field in the fifth info field frame 454 is N+PF, which is based on the PFC field in the second info field frame 424; and the PFC field in the sixth info field frame 464 is N+2*PF, which is based on the PFC field in the third info field frame 434.

The slave PHY processing device is configured to transmit the training frames (e.g., the fourth training frame 440, the fifth training frame 450, and the sixth training frame 450) to the master PHY processing device. To synchronize timing with the master PHY processing device, the slave PHY processing device is configured to transmit the info field frame (having the PFC count that matches the PFC count received from the master PHY processing device) within one (1) partial frame duration (PRST) of receiving the info field frame from the master PHY processing device. For example, the slave PHY processing device is configured to transmit the fourth info field frame 444 within one PRST of receiving the first info field frame 414 from the master PHY processing device. The slave PHY processing device is then configured to transmit the fifth info field frame 454 within one PRST of receiving the second info field frame 424 from the master PHY processing device. Next, the slave PHY processing device is configured to transmit the sixth info field frame 464 within one PRST of receiving the third info field frame 434 from the master PHY processing device.

Figure 5:
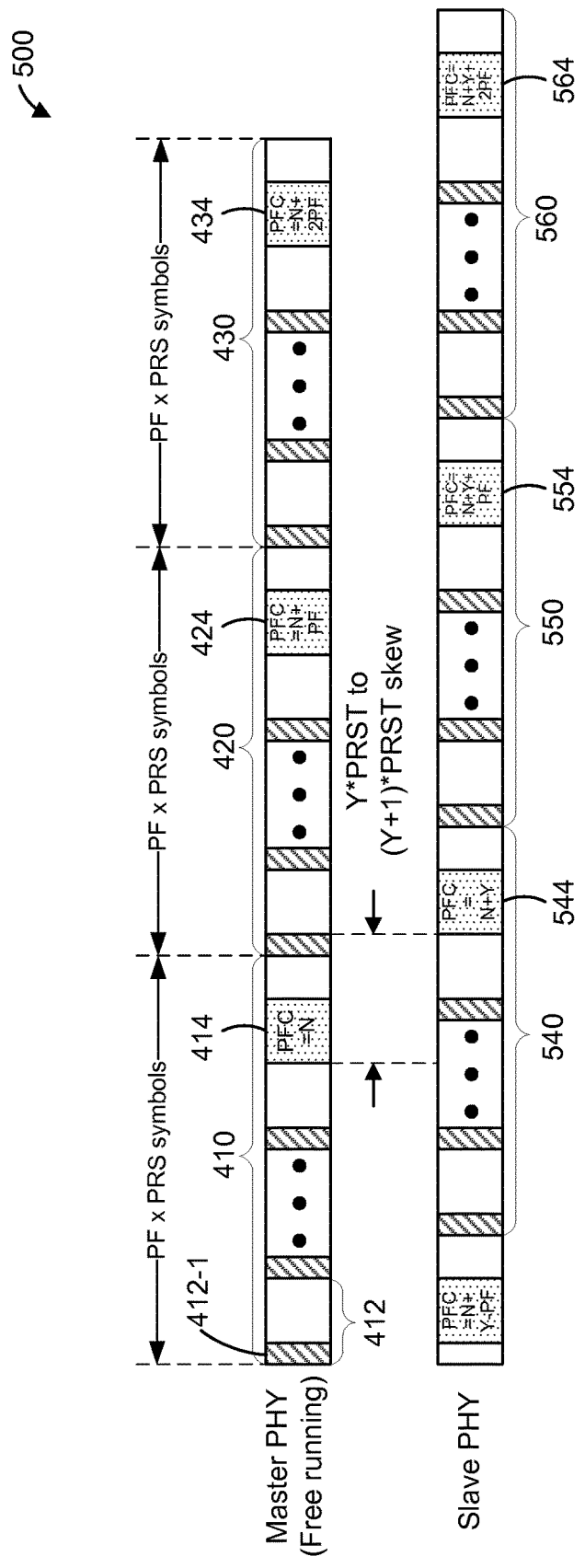
FIG. 5 is a diagram of other example training signals utilized for timing synchronization, according to another embodiment.

FIG. 5 is a diagram of another example timing synchronization signals 500 exchanged between a master device and a slave device, according to an embodiment. In some embodiments, the time synchronization signals 500 are generated by the PHY processing device 120 of FIG. 1 and its link partner, and FIG. 5 is described with reference to FIG. 1 for explanatory purposes. In other embodiments, however, the timing synchronization signals 500 are generated by another suitable pair of network interface devices. In some embodiments, the PHY processing device 120 is configured as a master PHY processing device, and the link partner of the PHY processing device 120 is configured as a slave PHY processing device. In other embodiments, the PHY processing device 120 is configured as the slave PHY processing device, and its link partner is configured as the master PHY processing device.

The timing synchronization signals 500 are similar to the timing synchronization signals 400 of FIG. 4, and the descriptions of like-numbered elements are omitted for brevity. The slave PHY processing device is configured to maintain a PFC based on the PFC fields received from the master PHY processing device. In an embodiment, the PFC maintained by the PHY processing device should be the same as the PFC maintained by the master processing device, but with a delay. In an embodiment, the slave PHY processing device is configured to accept the PFC field transmitted by the master PHY processing device only if a cycle redundancy check (e.g., CRC-16) returns no errors.

A PFC field from the slave PHY processing device should be transmitted within between Y*PRST and (Y+1)*PRST after the master PHY processing device transmits a PFC field, where Y is a suitable positive integer, and the PFC field from the slave PHY processing device should have a value that is Y plus the PFC transmitted by the master PHY processing device.

In FIG. 5, the slave PHY processing device is configured to generate training frames, e.g., a seventh training frame 540, an eighth training frame 550, and a ninth training frame 560, based on the training frames (e.g., training frames 410, 420, and 430) transmitted by the master PHY processing device. Each training frame generated by the slave PHY processing device has the same frame duration as an RS-encoded frame, and each training frame is divided into PF partial frames. Each partial frame includes PRS symbols. The boundary of each partial frame (except for at least one partial frame, e.g., the last partial frame) is marked by an inverted first bit. The slave PHY processing device is further configured to generate one info field frame per training frame. For example, the slave PHY processing device is configured to generate a seventh info field frame 544 in the seventh training frame 540, an eighth info field frame 554 in the eighth training frame 550, and a ninth info field frame 564 in the ninth training frame 560.

Each info field frame generated by the slave PHY processing device includes a PFC field. The PFC field generated by the slave PHY processing device is based on the info field frame (e.g., info field frames 414, 424, and 434) generated and transmitted by the master PHY processing device. However, unlike the time synchronization technique 400 of FIG. 4, the slave PHY processing device need not transmit an info field frame to the master PHY processing device within one (1) partial frame duration (PRST) of receiving an info field frame from the master PHY processing device. Instead, the slave PHY processing device is configured to transmit an info field frame to the master PHY processing device within an offset (Y+1)*PRST. In an embodiment, the slave PHY processing device is configured to transmit the info field frame to the master PHY processing device between Y*PRST and (Y+1)*PRST. For example, the PFC field in the seventh info field frame 544 is N+Y; the PFC field in the eighth info field frame 554 is N+Y+PF; and the PFC field in the ninth info field frame 564 is N+Y+2*PF.

According to various embodiments, a 1000BASE-T1 PHY processing device is configured to support Energy Efficient Ethernet (EEE). The EEE capability is a mechanism by which the 1000BASE-T1 PHY processing device is able to reduce power consumption during periods of low link utilization. The 1000BASE-T1 PHY processing device can enter a low power idle (LPI) mode of operation after reaching normal operation (i.e., after completing training and entering data mode). The 1000BASE-T1 PHY processing device is configured to enable LPI mode separately in each transmit and receive directions.

Figure 6A:
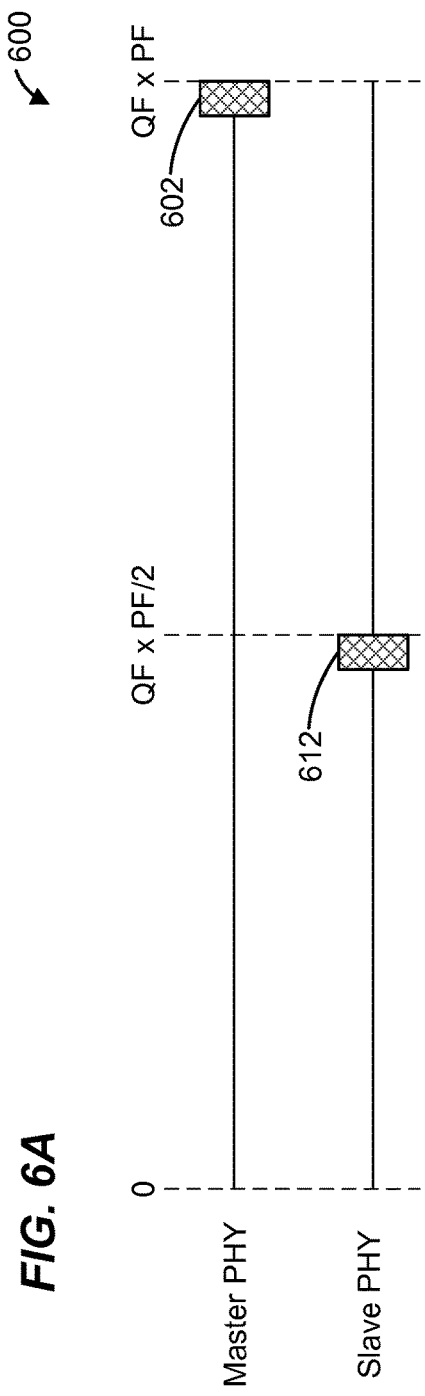
FIG. 6A is diagram of example refresh signals exchanged between devices during a low power idle mode.

To further illustrate the operation of a PHY processing device in LPI mode, FIG. 6A is diagram of an example a quiet/refresh cycle 600 of a master and slave PHY processing devices in operating in an LPI mode. The duration of the quiet/refresh cycle 600 can be represented by QF×RST, where RST is the duration of a RS-encoded frame and QF is a number of RSTs in the quiet/refresh cycle 600. RST can be represented by PF×PRST or PF×PRS, where PF is the number of partial frames per RS-encoded frame, PRST is the duration of a partial frame, and PRS is the number of PAM3 symbols in a partial frame. Thus, the quiet/refresh cycle 600 includes QF×PF number of PRS symbols. In the quiet/refresh cycle 600, the PHY processing device is configured to utilize a temporal location of the partial frame count determined during training mode to establish time synchronization during LPI mode.

To keep the PHY processing device and its link partner synchronized during LPI mode, a Refresh pattern is periodically sent by the PHY processing device and its link partner, and vice versa. In FIG. 6A, a master Refresh pattern 602 is sent to the master PHY processing device by the slave PHY processing device, and a slave Refresh pattern 612 is sent to the slave PHY processing device by the master PHY processing device. The slave Refresh pattern 612 is offset from the master Refresh pattern 602 by half of the quiet/refresh cycle 600 (i.e., offset by QF×PF/2 number of PRS symbols). In an embodiment, the Refresh pattern contains Refresh_LPI×PRS number of symbols.

Figure 6B:
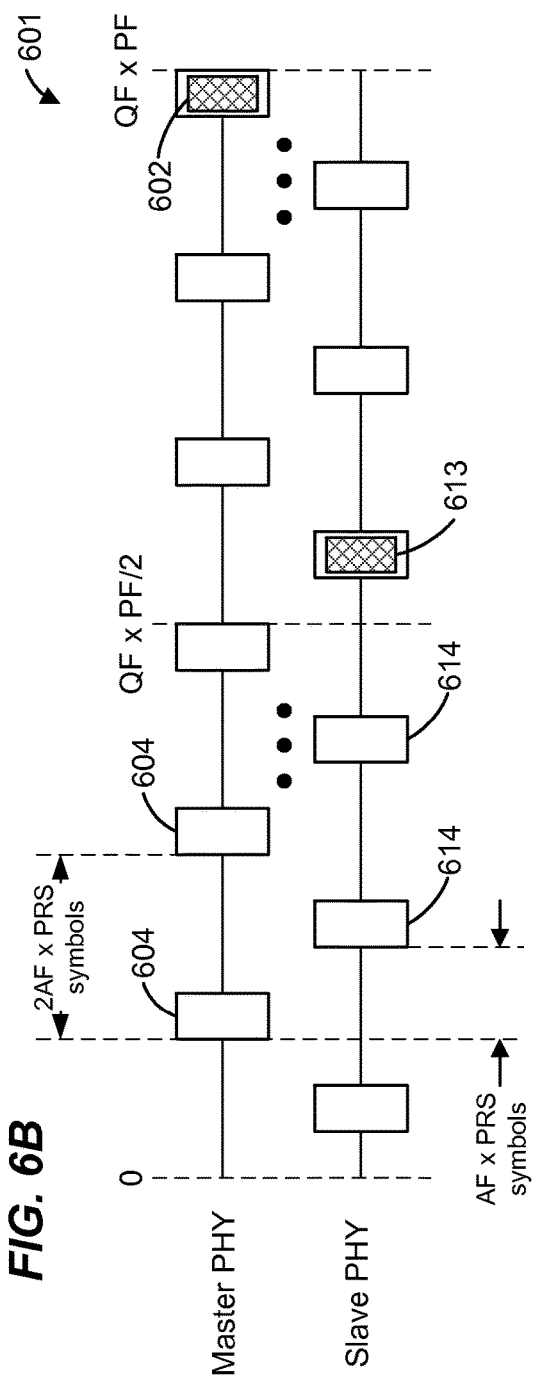
FIG. 6B is a diagram of example alert windows utilized by devices during a lower power idle mode, according to an embodiment.

FIG. 6B is a diagram of an example quiet/refresh cycle 601 with alert windows 604, according to operation of a master and slave PHY processing devices in a LPI mode, according to an embodiment. In some embodiments, the PHY processing device 120 of FIG. 1 and its link partner operate according to the quiet/refresh cycle 601, and FIG. 6B is described with reference to FIG. 1 for explanatory purposes. In other embodiments, however, the quiet/refresh cycle 601 is generated at another pair of network interface devices. In some embodiments, the PHY processing device 120 is configured as a master PHY processing device, and the link partner of the PHY processing device 120 is configured as a slave PHY processing device. In other embodiments, the PHY processing device 120 is configured as the slave PHY processing device, and its link partner is configured as the master PHY processing device.

In FIG. 6B, after entering the LPI mode, the master PHY processing device is configured to power up (at least receiver circuitry) to be prepared to receive an alert signal in each of a plurality of first alert windows 604 in the quiet/refresh cycle 601. The master PHY processing device is configured to exit the LPI mode only when an alert signal is received within a first alert window 604, the alert signal having been transmitted by a link partner device. Outside the first alert windows 604, a receiver of the master PHY processing device is allowed to power down.

After entering the LPI mode, the slave PHY processing device is configured to power up (at least receiver circuitry)

to be prepared to receive an alert signal in each of a plurality of second alert windows 614. The slave PHY processing device is configured to exit the LPI mode only when an alert signal is received within a second alert window 614, the alert signal having been transmitted by the master PHY processing device. Outside the second alert windows 614, a receiver of the slave PHY processing device is allowed to power down.

The first alert windows 604 (at the master PHY processing device) and the second alert windows 614 (at the slave PHY processing device) are staggered from one another so Alert signals do not overlap. In various embodiments, a second alert window 614 is offset from a first alert window 604 by AF×PRS symbols, where AF is a number of partial frame durations separating valid Alert signal starting points. The first alert windows 604 are separated from one another by 2*AF×PRS symbols, and the second alert windows 614 are also separated from one another by 2*AF×PRS symbols.

In an embodiment, the master PHY processing device is configured to transmit refresh signals only during alert windows of the slave PHY processing device. Similarly, the slave PHY processing device is configured to transmit refresh signals only during alert windows of the master PHY processing device. For example, the master PHY processing device receives the refresh pattern 602 during one of the first alert windows 604. The slave PHY processing device receives a refresh pattern 613 during one of the second alert windows 614.

FIG. 7 is table 700 of example parameter values according to various Reed-Solomon error correction encoding schemes, utilized at a PHY processing device, according to some embodiments. In some embodiments, various parameters shown in table 700 are utilized at the PHY processing device 120 of the network interface device of FIG. 1, and FIG. 7 is described with reference to FIG. 1 for explanatory purposes. In other embodiments, however, parameters shown in table 700 are utilized by another suitable network interface device. Similarly, in some embodiments, suitable parameters different than those shown in FIG. 7 are utilized by the PHY processing device 120 instead of, or in addition to, the parameters of FIG. 7.

Table 700 illustrates example parameter values according to three RS encoding schemes. The first RS encoding scheme 702 is represented by the notation RS(180, 154), in which 180 symbols are encoded to make a 154 symbol RS codeword. The second RS encoding scheme 704 is represented by the notation RS(360, 308), in which 360 11-bit symbols are encoded to make a 308 symbol RS codeword. The third RS encoding scheme 706 is represented by the notation RS(630, 539), in which 630 11-bit symbols are encoded to make a 539 symbol RS codeword. In some embodiments, each symbol consists of 11 bits. In other embodiments, each symbol consists of another suitable number of bits. Although three RS encoding schemes are shown in table 700, in other embodiments, the PHY processing device 120 is configured to implement other RS encoding schemes compliant with 1000BASE-T1.

The example parameters shown in table 700 include the following:

RS: number of PAM3 symbols per RS-encoded frame duration;

RST: duration of a RS-encoded frame in ns;

PRS: number of PAM3 symbols per partial frame in a RS-encoded frame duration;

PRST: duration of a partial frame in ns;

PF: number of partial frames per RS-encoded frame duration;

QF: number of RS-encoded frame durations per quiet/refresh cycle in LPI mode;

AF: number of partial frames separate alert windows;

Refresh_LPI: number of partial frames for a Refresh pattern;

Enter_LPI_RS: number of partial frames with LPI signal to enter LPI mode;

Alert_LPI: number of alert sequences to exit LPI mode;

Exit_LPI_RS: number of RS frame durations with all idle signals upon exiting LPI mode; and Alert_sym: number of RS symbols in an alert sequence.

In other embodiments, the parameters shown in table 700 are assigned different values based on the RS encoding scheme chosen by the PHY processing device. In still other embodiments, parameters other than those shown in table 700 are used based on the error correction encoding scheme(s) used by the PHY processing device.

In some embodiments, the number of partial frames in a frame having the same duration as an RS-encoded frame is an integer, i.e., PF=RS/PRS=RST/PRST is an integer. In an embodiment, the frame duration of a partial frame is an integer multiple of 8*N ns, where N is the number of symbols encoded in each RS-encoded frame.

Figure 8:
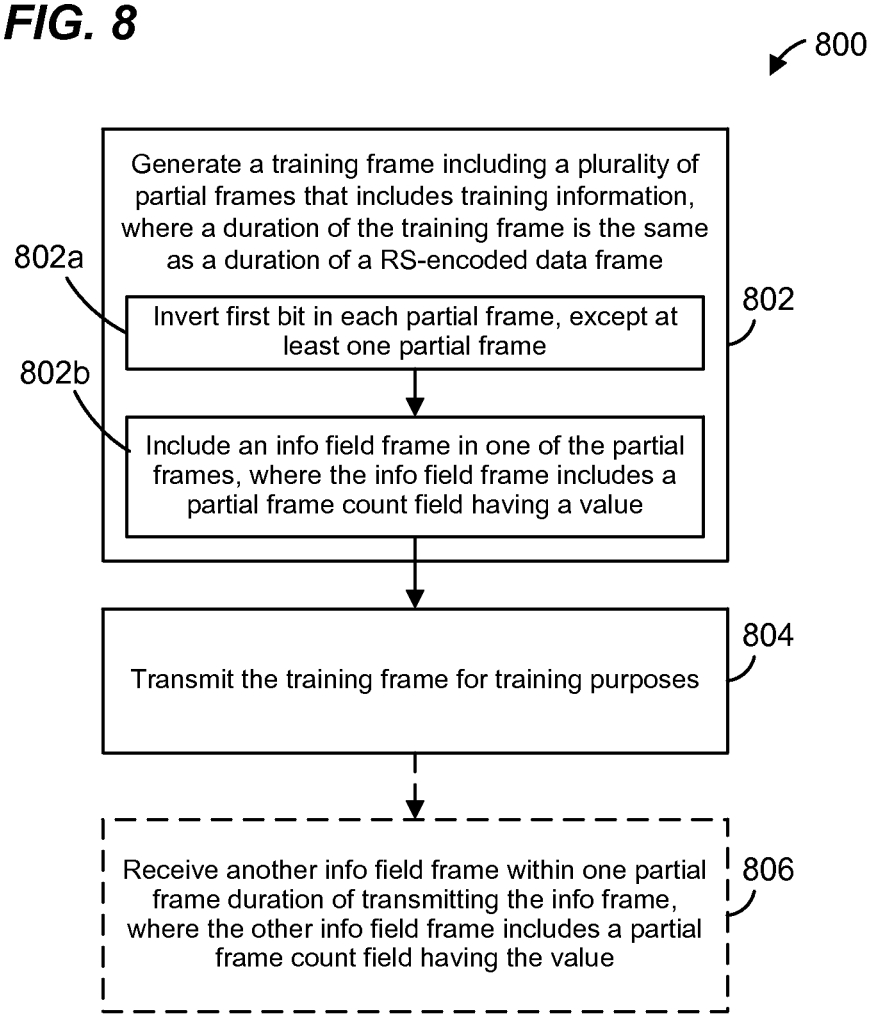
FIG. 8 is a flow diagram of an example method, implemented at a master PHY processing device, for generating a training frame, according to an embodiment.

FIG. 8 is a flow diagram of an example method 800, implemented at a master PHY entity, for generating a training frame, according to an embodiment. In some embodiments, the method 800 is implemented at the PHY processing device 120 (a 1000BASE-T1 PHY processing device) of the network interface device of FIG. 1, and FIG. 8 is described with reference to FIG. 1 and FIG. 4 for explanatory purposes. In other embodiments, however, the method 800 is implemented by another suitable network interface device. FIG. 8 is discussed in the context of the PHY processing device 120 being configured as a master PHY processing device.

At 802, the PHY processing device 120, according to an embodiment, is configured to generate a training frame (e.g., first training frame 410). The training frame includes a plurality of partial frames (e.g., partial frames 412) that include training information. The training frame has a defined duration. In FIG. 8, the duration of the training frame is the same as a duration of a RS-encoded frame. In other embodiments, the duration of the training frame is the same as a duration of a communication frame exchanged between the PHY processing device 120 and its link partner. For example, in other embodiments, the training frame has the same frame duration as a communication frame that does not correspond to an error correction encoding frame, or corresponds to an error correction encoding frame that uses another suitable error correction encoding scheme other than RS. The PHY processing device 120 is further configured to generate the training frame by inverting a first bit (e.g., inverted first bit 412-1) in each partial frame (except for at least one partial frame) at 802a, and including an info field frame (e.g., info field frame 414) in one of the partial frames of the training frame at 802b. In an embodiment, the first bit of the partial frame that includes the info field frame is not inverted. Then at 804, the PHY processing device 120 is configured to transmit the training frame for training purposes.

According to another embodiment, the PHY processing device 120 is configured to generate the info field frame to include a partial frame count (PFC) field. In an embodiment, the PFC field has a value (e.g., N) that is based on the number of partial frames generated at the master PHY processing device. At 806, the PHY processing device 120 is configured to receive another info field frame (e.g., fourth info field 444) within one partial frame duration of transmitting the info field frame (e.g., first info field 414), and the other info field frame includes a partial frame count field having the same value (e.g., N), the other info field frame having been generated by the slave PHY processing device.

According to another embodiment, the PHY processing device 120 is configured to receive another info field frame after transmitting the info field frame, the other info field frame having been generated by the slave PHY processing device. The other info field includes a partial frame count field having another value, where the other value is a sum of the value (e.g., N) and a skew value (e.g., Y), where the other info field frame is received between Y*PRST and (Y+1)*PRST after the beginning of the info field frame generated by the PHY processing device 120.

According to yet another embodiment, the PHY processing device 120 is configured to generate each partial frame to have same number of symbols. According to still another embodiment, the PHY processing device 120 is configured to generate the info field frame as a last partial frame in the training frame.

According to an embodiment, the PHY processing device 120 is configured to generate a second training frame (e.g., second training frame 420). The second training frame includes a plurality of second partial frames. The PHY processing device 120 is configured to generate the second training frame by inverting a first bit in each second partial frame (except for at least one partial frame), and including a second info field frame (e.g., second info field frame 424) in the second training frame. In addition, a number of partial frames in the training frame is the same as a number of second partial frames in the second training frame.

According to another embodiment, the PHY processing device 120 is configured to generate the info field frame to include a first partial frame count field having a first value (e.g., N), and to generate the second info field frame to a second partial frame count field having a second value. The second value is a sum of the first value (e.g., N) and the number of partial frames (e.g., PF) in the first training frame. In another embodiment, the second value is the first value (e.g., N) incremented by 1 (e.g., N+1).

According to still another embodiment, the PHY processing device 120 is configured to receive a third info field frame (e.g., fifth info field frame 454) within one partial frame duration of transmitting the second info field frame (e.g., second info field frame 424), the third info field frame having been generated by the slave PHY processing device. The third info field frame includes a partial frame count field having the second value (e.g., N+PF).

According to another embodiment, the PHY processing device 120 is configured to receive a third info field frame after transmitting the second info field frame, the third info field frame having been generated by the slave PHY processing device. The third info field frame includes a partial frame count field having a third value, where the third value is a sum of the second value and a skew value Y, where the third info field frame is received between (N+PF+Y)*PRST and (N+PF+Y+1)*PRST after the beginning of the second field frame generated by the PHY processing device 120.

Figure 9:
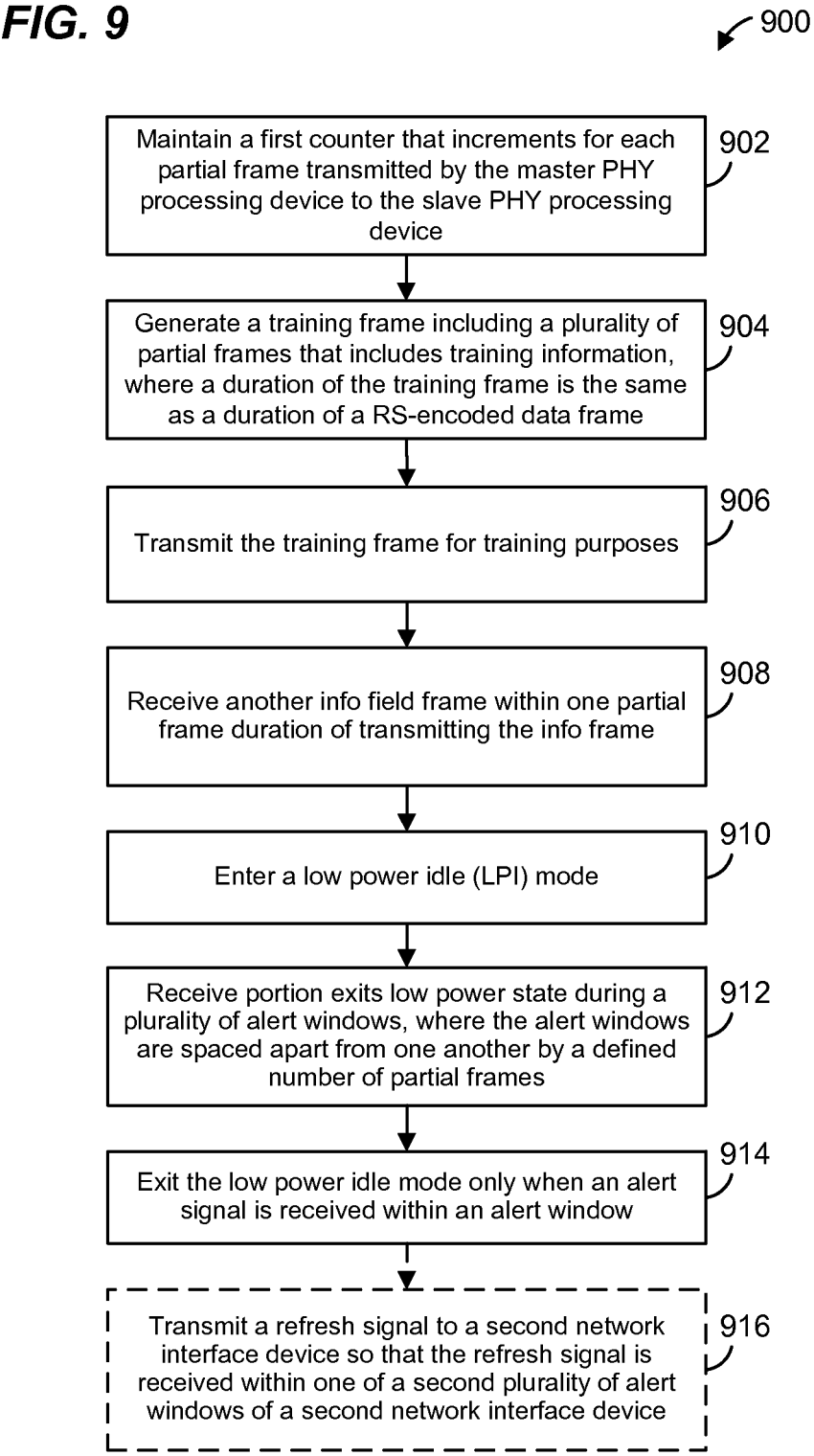
FIG. 9 is a flow diagram of an example method, implemented at a master PHY processing device, for operating in a low power idle (LPI) mode, according to an embodiment.

FIG. 9 is a flow diagram of an example method 900, implemented at a master PHY entity, for operating in a low power idle (LPI) mode, according to an embodiment. In some embodiments, the method 900 is implemented at the PHY processing device 120 (a 1000BASE-T1 PHY processing device) of the network interface device of FIG. 1, and FIG. 9 is described with reference to FIG. 1 and FIG. 6B for explanatory purposes. In other embodiments, however, the method 900 is implemented by another suitable network interface device. The method 900 is described in the context of the PHY processing device 120 being configured as a master PHY processing device.

At 902, the PHY processing device 120, according to an embodiment, is configured to maintain a first counter that increments for each partial frame transmitted by the PHY processing device 120. At 904, the PHY processing device 120 is configured to generate a training frame for training purposes. The training frame includes a plurality of partial frames that include training information. The PHY processing device 120 is configured to generate the training frame by including a first info field frame in the training frame. The first info field frame includes a first partial frame count field having a first value corresponding to a first count of the first counter, and the first partial frame count field is for synchronizing a second counter of the second network interface device with the first counter of the PHY processing device 120, where the second network interface device corresponds to a link partner of the PHY processing device 120 (e.g., a slave PHY processing device).

Then at 906, the PHY processing device 120 is configured to transmit the training frame to the second network interface device. At 908, the PHY processing device 120 is configured to receive a second info field frame from the second network interface device, where a beginning of the second info field frame is received within one partial frame duration of transmission of a beginning of the first info field frame. The second info field includes a second partial frame count field having a second value corresponding to a second count of the second counter, and the first value is the same as the second value.

At 910, the PHY processing device 120 is configured to enter a LPI mode. At 912, at least a receive portion of the PHY processing device 120 is configured to exit a low power state during a plurality of alert windows (e.g., first alert window 604), where the receive portion of the PHY processing device 120 is configured to be prepared to receive an alert signal during the alert windows. In an embodiment, the alert windows are spaced apart from one another by a defined number of partial frames (e.g., 2*AF partial frames). At 914, the PHY processing device 120 is configured to exit the low power idle mode only when an alert signal is received within one of the alert windows, the alert signal having been generated by a slave device.

In the method 900, a duration of the training frame is the same as a duration of a RS-encoded frame. In other embodiments, however, the duration of the training frame is the same as a duration of each error correction encoded frame exchanged between the PHY processing device 120 and the second network interface device.

According to another embodiment, the PHY processing device 120 is communicatively coupled to the second network interface device (e.g., a slave PHY processing device). In this case, at 910, the PHY processing device 120 is configured to transmit an alert signal to the second network interface device so that the alert signal is received within one of a second plurality of alert windows (e.g., second alert window 614) of the second network interface device.

According to yet another embodiment, a plurality of second alert windows of the second network interface device is offset from the plurality of alert windows of the PHY processing device 120 by a duration corresponding to one half of the time between the start of adjacent alert windows of the PHY processing device 120.

According to still another embodiment, the PHY processing device 120 is configured to transmit an alert signal to the second network interface device so that the alert signal is received within one of the second alert windows of the second network interface device.

According to an embodiment, the PHY processing device 120 is configured to transmit a refresh signal (e.g., slave Refresh pattern 613) to the second network interface device so that the refresh signal is received within one of a second plurality of alert windows (e.g., second alert window 614) at the second network interface device.

According to another embodiment, the PHY processing device 120 is configured to refresh a receiver of PHY processing device 120 only when a refresh signal (e.g., master Refresh pattern 602) is received within an alert window (e.g., alert window 604).

Figure 10:
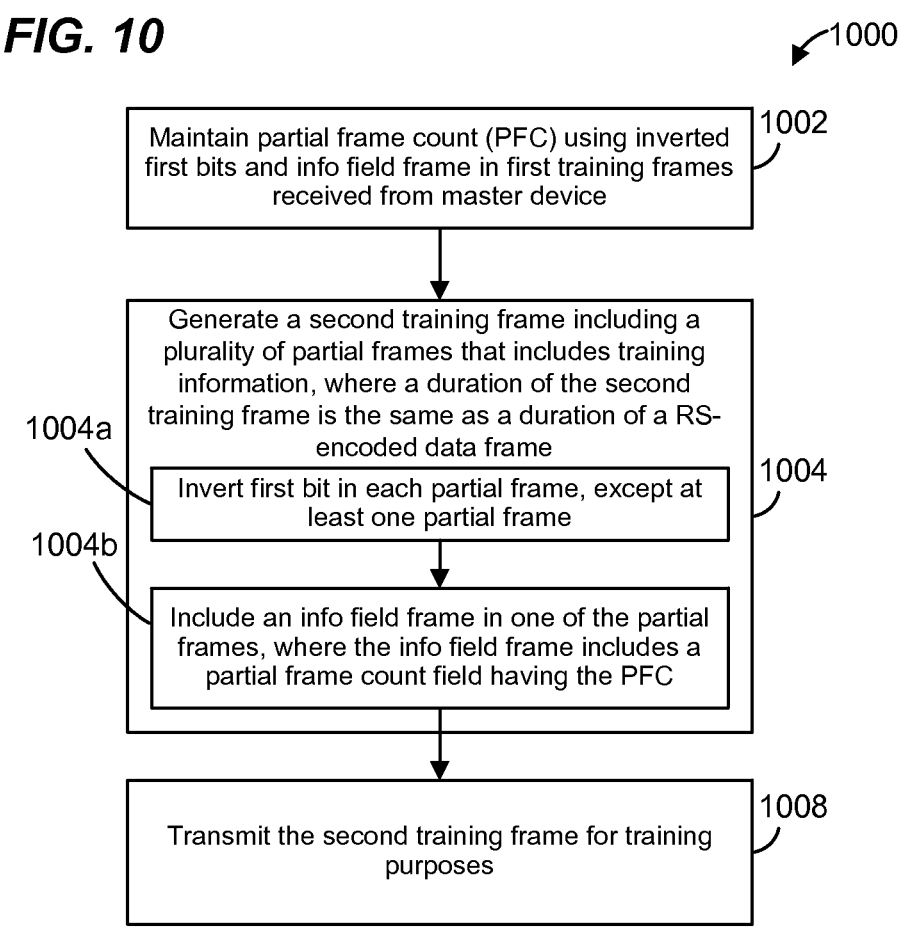
FIG. 10 is a flow diagram of an example method, implemented at a slave PHY processing device, for generating a training frame, according to an embodiment.

FIG. 10 is a flow diagram of an example method 1000, implemented at a slave PHY entity, for generating a training frame, according to an embodiment. In some embodiments, the method 1000 is implemented at the PHY processing device 120 (a 1000BASE-T1 PHY processing device) of the network interface device of FIG. 1, and FIG. 8 is described with reference to FIG. 1 and FIG. 4 for explanatory purposes. In other embodiments, however, the method 1000 is implemented by another suitable network interface device. The method 1000 is described in the context of the PHY processing device 120 being configured as a slave PHY processing device.

At 1002, the PHY processing device 120, according to an embodiment, is configured to maintain a partial frame count (PFC) based on partial frame count fields and inverted first bits in first training frames received from a master device.

At 1004, the PHY processing device 120, is configured to generate a second training frame (e.g., second training frame 440). The second training frame includes a plurality of partial frames (e.g., partial frames 412) that include training information. A duration of the second training frame is the same as a duration of a RS-encoded frame. The PHY processing device 120 is further configured to generate the second training frame by inverting a first bit (e.g., inverted first bit 412-1) in each partial frame (except for at least one partial frame) at 1004a, and including an info field frame (e.g., info field frame 444) in one of the partial frames of the training frame at 1004b. In an embodiment, the first bit of the partial frame that includes the info field frame is not inverted. The info field frame includes the PFC maintained at block 1002.

Then at 1008, the PHY processing device 120 is configured to transmit the second training frame to the master device for training purposes so that a beginning of the info field frame (the second info field frame) of the second training frame is transmitted within a defined time period after the beginning of an info field frame of one of first training frames (the first info field frame) is received. In an embodiment, the first info field frame includes a first PFC count of N, and the second info field frame includes a second PFC count of N. In this embodiment, the beginning of the second info field frame is transmitted within one partial frame duration of the beginning of the first info field frame.

In an embodiment, the first info field frame includes a first PFC count of N, and the second info field frame includes a second PFC count of N+Y, where Y is a suitable positive integer. In this embodiment, the beginning of the second info field frame is transmitted between i) Y partial frame durations and ii) Y+1 partial frame durations after the beginning of the first info field frame.

Figure 11:
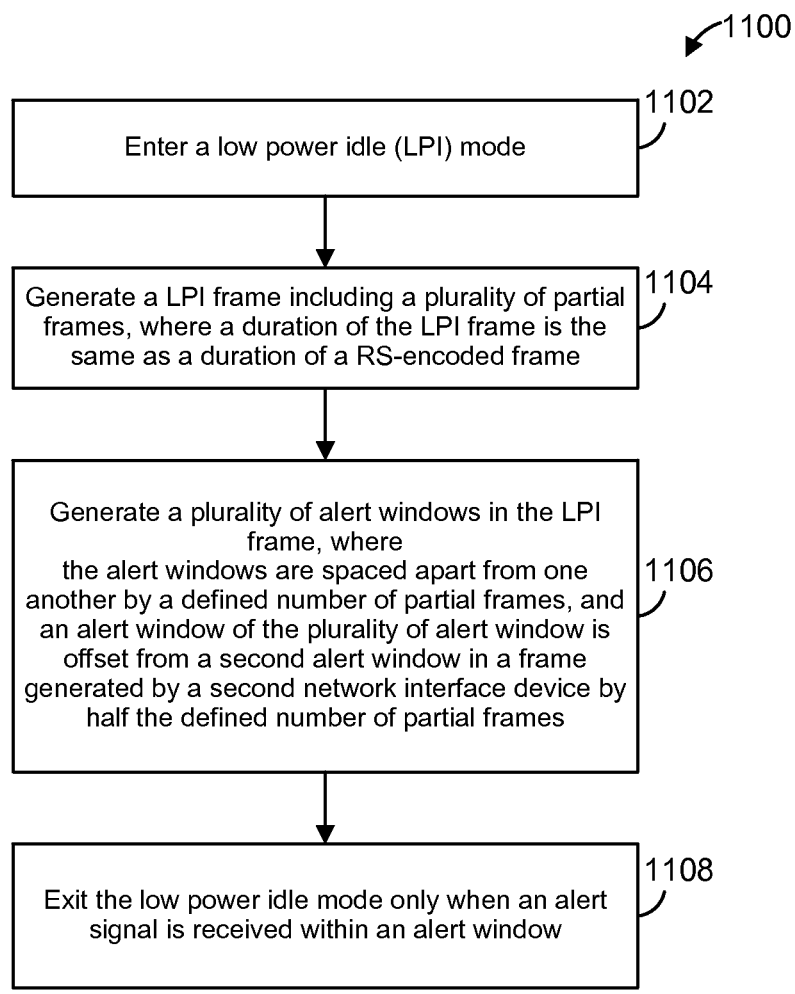
FIG. 11 is a flow diagram of an example method, implemented at a slave PHY processing device, for operating during a LPI mode, according to an embodiment.

FIG. 11 is a flow diagram of an example method 1100, implemented at a slave PHY entity, for generating a LPI frame, according to an embodiment. In some embodiments, the method 1100 is implemented at the PHY processing device 120 (a 1000BASE-T1 PHY processing device) of the network interface device of FIG. 1, and FIG. 11 is described with reference to FIG. 1 and FIG. 6B for explanatory purposes. In other embodiments, however, the method 1100 is implemented by another suitable network interface device. FIG. 11 is described in the context of the PHY processing device 120 being configured as a slave PHY processing device.

At 1102, the PHY processing device 120, according to an embodiment, is configured to enter a LPI mode. At 1106, at least a receive portion of the PHY processing device 120 is further configured to exit a low power state during a first plurality of alert windows (e.g., second alert windows 614), where the receive portion of the PHY processing device 120 is configured to be prepared to receive an alert signal during the alert windows in the first plurality of alert windows. In an embodiment, the alert windows in the first plurality of alert windows are spaced apart from one another by a defined number of partial frame durations (e.g., 2*AF partial frame durations). The first plurality of alert windows is offset from a second plurality of alert windows of a second network interface device (e.g., master PHY processing device) by half the defined number of partial frame durations (e.g., AF partial frame durations). At 1108, the PHY processing device 120 is configured to exit the LPI mode only when an alert signal is received within one of the alert windows in the first plurality of alert windows, the alert signal having been generated by the master device.

At least some of the various blocks, operations, and techniques described above may be implemented utilizing hardware, a processor executing firmware instructions, a processor executing software instructions, or any suitable combination thereof. When implemented utilizing a processor executing software or firmware instructions, the software or firmware instructions may be stored in any tangible, non-transitory computer readable medium, or media, such as a magnetic disk, an optical disk, a random access memory (RAM), a read only memory (ROM), a flash memory, a memory of a processor, a tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:
1. A method, comprising:
generating, at a network interface device, a training frame comprising a plurality of partial frames that include training information, and the generating including
inverting, at the network interface device, a respective first bit in each of at least some partial frames, and
including, at the network interface device, an info field frame in the training frame; and
transmitting, with the network interface device, the training frame for training purposes, the training frame including the info field frame and the plurality of partial frames, wherein each of the at least some of the partial frames includes the respective inverted first bit when the training frame is transmitted.

2. The method of claim 1, wherein a duration of the training frame is the same as a duration of a Reed-Solomon encoded frame.

3. The method of claim 1, wherein each partial frame comprises a same number of symbols.

4. The method of claim 1, wherein the inserting the info field frame in the training frame comprises:
inserting, at the network interface device, the info field frame in a last partial frame in the plurality of partial frames.

5. The method of claim 1, wherein the info field frame comprises a partial frame count field having a value, and the method further comprises:
receiving, at the network interface device, another info field frame from another network interface device, wherein a beginning of the other info field frame is received within one partial frame duration of transmission of a beginning of the info field frame, wherein the other info field frame comprises a partial frame count field having the value.

6. The method of claim 1, wherein the info field frame comprises a partial frame count field having a value, and the method further comprises:
receiving, at the network interface device, another info field frame from another network interface device, wherein the other info field comprises a partial frame count field having another value, wherein the other value is a sum of the value and a skew value Y, and wherein a beginning of the other info field frame is received between Y partial frame durations and Y+1 partial frame durations after transmission of a beginning of the info field frame.

7. The method of claim 1, further comprising:
generating, at the network interface device, a second training frame comprising a plurality of second partial frames, including
inverting, at the network interface device, a first bit in each of at least some second partial frames, and
including, at the network interface device, a second info field frame in the second training frame,
wherein a number of partial frames in the training frame is the same as a number of second partial frames in the second training frame; and
transmitting, with the network interface device, the second training frame for training purposes.

8. The method of claim 7, wherein
the info field frame comprises a first partial frame count field having a first value; and
the second info field frame comprises a second partial frame count field having a second value, wherein the second value is a sum of the first value and the number of partial frames in the training frame.

9. The method of claim 7, wherein
the info field frame comprises a first partial frame count field having a first value; and
the second info field frame comprises a second partial frame count field having a second value, wherein the second value is the first value incremented by one.

10. A method, comprising:
maintaining, at a first network interface device, a first counter that increments for each partial frame transmitted by the first network interface device to a second network interface device;
generating, at the first network interface device, a training frame for training purposes, wherein the training frame comprises a plurality of partial frames that include training information, wherein generating the training frame comprises
including, at the first network interface device, a first info field frame in the training frame, wherein the first info field frame comprises a first partial frame count field having a first value corresponding to a first count of the first counter, wherein the first partial frame count field is for synchronizing a second counter of the second network interface device with the first counter of the first network interface device;
transmitting, with the first network interface device, the training frame to the second network interface device; and
receiving, at the first network interface device, a second info field frame from the second network interface device, wherein a beginning of the second info field frame is received within one partial frame duration of transmission of a beginning of the first info field frame, wherein the second info field comprises a second partial frame count field having a second value corresponding to a second count of the second counter, and wherein the first value is the same as the second value.

11. The method of claim 10, wherein a duration of the training frame is the same as a duration of each error correction encoded frame exchanged between the first network interface device and the second network interface device.

12. The method of claim 11, wherein each error correction encoded frame is a Reed-Solomon encoded frame.

13. The method of claim 10, further comprising:
entering, at the first network interface device, a low power idle (LPI) mode;
during the LPI mode,
using, at the first network interface device, the first counter to determine timing of a plurality of alert windows, wherein alert windows in the plurality of alert windows are spaced apart from one another by a defined duration that is the same as a duration of one or more partial frames,
exiting, at a receive portion of the first network interface device, a low power mode during the plurality of alert windows and re-entering the low power mode, at the receive portion of the first network device, between alert windows in the plurality of alert windows, and
exiting, at the first network interface device, the LPI mode only when an alert signal is received within one of the alert windows.

14. The method of claim 13, further comprising refreshing, at the first network interface device, the receive portion of the first network interface device only when a refresh signal is received within one of the alert windows.

15. The method of claim 13, wherein second alert windows in a plurality of second alert windows of the second network interface device are spaced apart from one another by the defined duration, and the second plurality of alert windows is offset from the plurality of alert windows by one half of the defined duration.

16. The method of claim 15, further comprising transmitting, with the first network interface device, an alert signal to the second network interface device so that the alert signal is received within one of the second alert windows in the plurality of second alert windows at the second network interface device.

17. The method of claim 15, further comprising transmitting, with the network interface device, a refresh signal to the second network interface device so that the refresh signal is received within one of the second alert windows in the plurality of second alert windows at the second network interface device.

18. A network interface device, comprising:
a media access control (MAC) processing device implemented on one or more integrated circuits; and
a physical layer (PHY) processing device coupled to the MAC processing device, wherein the PHY processing device is implemented on the one or more integrated circuits, and wherein the PHY processing device is configured to:
generate a training frame comprising a plurality of partial frames that includes training information, and the PHY processing device is configured to generate the training frame by
inverting a respective first bit in each of at least some partial frames, and
including an info field frame in the training frame;
wherein the PHY processing device is further configured to transmit the training frame to another PHY processing device for training purposes, the training frame including the info field frame and the plurality of partial frames, wherein each of the at least some of the partial frames includes the respective inverted first bit when the training frame is transmitted.

19. The network interface device of claim 18, wherein a duration of the training frame is the same as a duration of a Reed-Solomon encoded frame.

20. The network interface device of claim 18, wherein each partial frame comprises a same number of symbols.

21. The network interface device of claim 18, wherein the PHY processing device is configured to include the info field frame in a last partial frame in the plurality of partial frames.

22. The network interface device of claim 18, wherein the info field frame comprises a partial frame count field having a value, and the PHY processing device is further configured to
receive another info field frame from the other PHY processing device, wherein a beginning of the other info field frame is received within one partial frame duration of transmitting a beginning of the info field frame, wherein the other info field frame comprises a partial frame count field having the value.

23. The network interface device of claim 18, wherein the info field frame comprises a partial frame count field having a value, and the PHY processing device is further configured to
receive another info field frame from the other PHY processing device, wherein the other info field comprises a partial frame count field having another value that is a sum of the value and a skew value Y, and wherein a beginning of the other info field frame is received between Y partial frame durations and Y+1 partial frame durations after transmission of a beginning of the info field frame.

24. The network interface device of claim 18, wherein the PHY processing device is further configured to
generate a second training frame comprising a plurality of second partial frames by inverting a first bit in each of at least some second partial frames, and including a second info field frames in the second training frame, wherein a number of partial frames in the training frame is the same as a number of second partial frames in the second training frame, and
transmit the second training frame to other PHY processing device for training purposes.

25. The network interface device of claim 24, wherein
the info field frame comprises a first partial frame count field having a first value; and
the second info field frame comprises a second partial frame count field having a second value, wherein the second value is a sum of the first value and the number of partial frames in the training frame.

26. The network interface device of claim 24, wherein
the info field frame comprises a first partial frame count field having a first value; and
the second info field frame comprises a second partial frame count field having a second value, wherein the second value is the first value incremented by one.

27. A network interface device, comprising:
a media access control (MAC) processing device implemented on one or more integrated circuits; and
a physical layer (PHY) processing device coupled to the MAC processing device, wherein the PHY processing device is implemented on the one or more integrated circuits, and wherein the PHY processing device is configured to:
maintain a first counter that increments for each partial frame transmitted by the network interface device to a second network interface device, and
generate a training frame for training purposes, wherein the training frame comprises a plurality of partial frames that include training information, wherein generating the training frame comprises
including a first info field frame in the training frame, wherein the first info field frame comprises a first partial frame count field having a first value corresponding to a first count of the first counter, wherein the first partial frame count field is for synchronizing a second counter of the second network interface device with the first counter of the network interface device;
wherein the PHY processing device is further configured to:
transmit the training frame to the second network interface device, and
receive a second info field frame from the second network interface device, wherein a beginning of the second info field frame is received within one partial frame duration of transmission of a beginning of the first info field frame, wherein the second info field comprises a second partial frame count field having a second value corresponding to a second count of the second counter, and wherein the first value is the same as the second value.

28. The network interface device of claim 27, wherein a duration of the training frame is the same as a duration of each error correction encoded frame exchanged between the network interface device and the second network interface device.

29. The network interface device of claim 28, wherein each error correction encoded frame is a Reed-Solomon encoded frame.

30. The network interface device of claim 27, wherein the PHY processing device is further configured to
enter a low power idle (LPI) mode;
during the LPI mode,
use the first counter to determine timing of a plurality of alert windows, wherein alert windows in the plurality of alert windows are spaced apart from one another by a defined duration that is the same as a duration of one or more partial frames, exit, at a receive portion of the PHY processing device, a low power mode during the plurality of alert windows and re-enter the low power mode, at the receive portion of the PHY processing device, between alert windows in the plurality of alert windows, and exit the LPI mode only when an alert signal is received within one of the alert windows.

31. The network interface device of claim 27, wherein the PHY processing device is configured to refresh the receive portion of the PHY processing device only when a refresh signal is received within one of the alert windows.

32. The network interface device of claim 27, wherein second alert windows in a plurality of second alert windows of the second network interface device are spaced apart from one another by the defined duration, and the plurality of second alert windows is offset from the plurality of alert windows by one half of the defined duration.

33. The network interface device of claim 32, wherein the PHY processing device is further configured to transmit an alert signal to the second network interface device so that the alert signal is received within one of the second alert windows in the plurality of second alert windows at the second network interface device.

34. The network interface device of claim 32, wherein the PHY processing device is further configured to transmit a refresh signal to the second network interface device so that the refresh signal is received within one of the second alert windows in the plurality of second alert windows at the second network interface device.

* * * * *